No. 631,371. Patented Aug. 22, 1899.
E. E. KITHCART & B. W. WARNER.
SEPARATOR.
(Application filed Apr. 27, 1899.)
(No Model.)
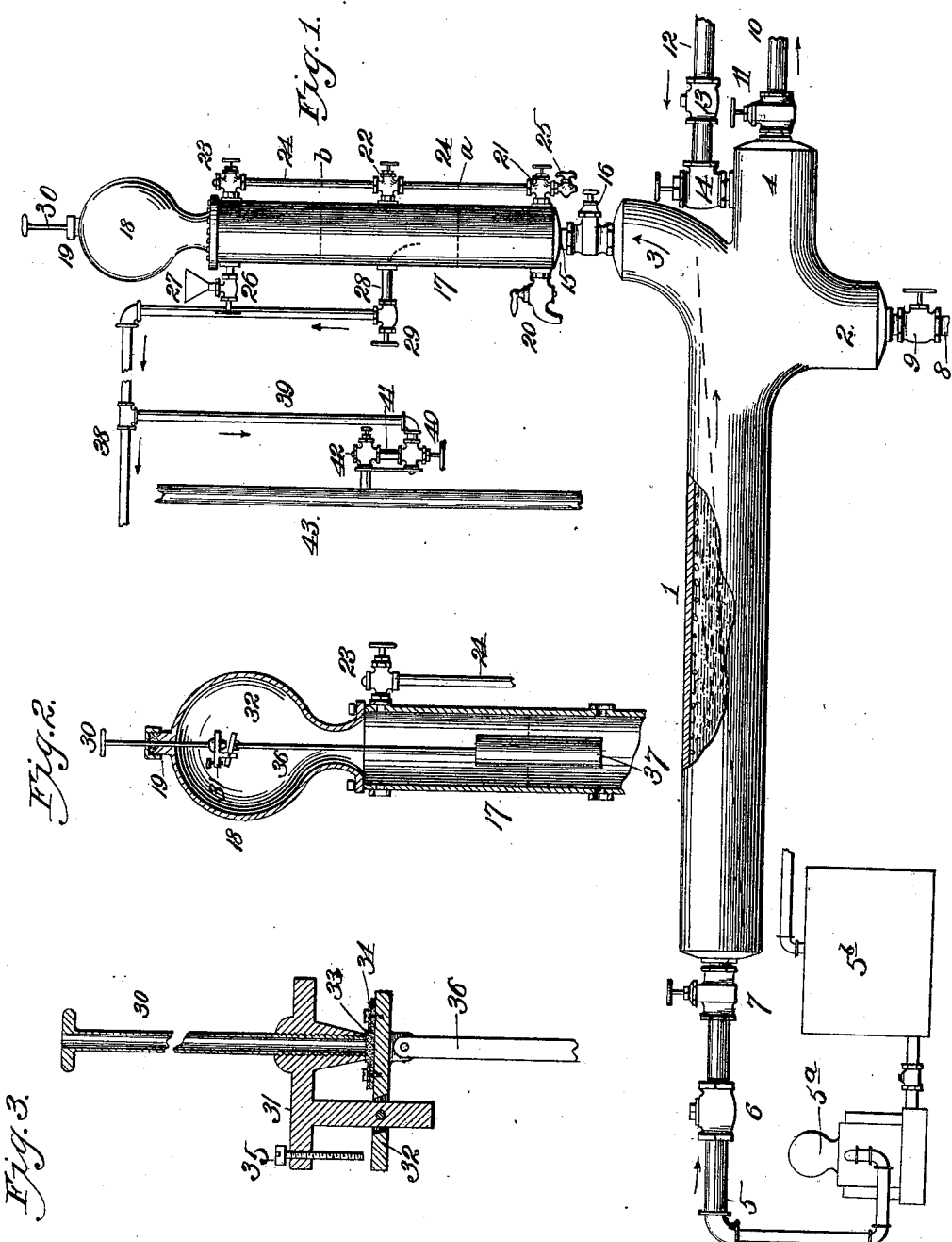
Witnesses:
C. F. Bartholomew
M. R. Remley
Inventors.
E. E. Kithcart, B. W. Warner.
By Heydon Fischer & Thorpe
Attys.

UNITED STATES PATENT OFFICE.

EUGENE E. KITHCART AND BENJAMIN W. WARNER, OF KANSAS CITY, MISSOURI.

SEPARATOR.

SPECIFICATION forming part of Letters Patent No. 631,371, dated August 22, 1899.

Application filed April 27, 1899. Serial No. 714,643. (No model.)

*To all whom it may concern:*

Be it known that we, EUGENE E. KITHCART and BENJAMIN W. WARNER, of Kansas City, Jackson county, Missouri, have invented certain new and useful Improvements in a Combined Automatic Oil Separator and Filter and Perpetual Lubricator, of which the following is a specification.

Our invention relates to combined automatic oil separators and filters and perpetual lubricators, and has for its prime objects the filtration and separation of the oil from the water pumped from the condenser of a steam plant or from a condensing-engine, so that the purified oil may be again used for lubricating or other purposes and the purified water be utilized to again supply a boiler or used for any other purpose, and to provide means whereby the oil may be caused to circulate through the parts to be lubricated and through the filtration and separation device an indefinite number of times—*i. e.*, until the lubricating properties of the oil are exhausted. In other words, our object is by effecting a large saving of oil and water to reduce materially the cost of operating a steam power or heating plant.

To this end the invention consists in certain novel and peculiar features of construction and combinations of parts, as will be hereinafter described and claimed, and in order that it may be fully understood reference is to be had to the accompanying drawings, in which—

Figure 1 represents a side elevation of a combined automatic separator and filter and perpetual lubricator, partly broken away, embodying our invention. Fig. 2 is an enlarged vertical section of a portion of the lubricator. Fig. 3 is a detailed section of the automatic air-release valve forming a part of said lubricator.

In the said drawings, 1 designates a hollow cylinder or casing forming the oil filtration and separation element of our invention, said cylinder being provided near its rear end with a drain-chamber 2. At the corresponding end the cylinder is formed with an upwardly-extending passage 3, and preferably between the passage 3 and the chamber 2 with a chamber 4. This cylinder contains no filtration substance other than water, through which oil and air, by virtue of being lighter than water, passes upward to the point of outlet—viz., the passage 3, termed the "oil and air passage," because all of the oil and air escapes from the cylinder at this point, as hereinafter explained. The cylinder, including this passage 3, stands full of water as long as the plant is in operation, the water which enters the cylinder after it is once filled passing off as an under-current through the water-passage 4, while the sediment or foreign substances extracted from the water and oil are precipitated into chamber 2, from which they are removed, as hereinafter explained. This cylinder constitutes a gravity-filter. The passage of the oil from the time it enters the cylinder through pipe 1 until it enters passage 3 is approximately traced by the oblique broken line shown in Fig. 1, the heavy marks above the same where the interior of the cylinder is disclosed representing the oil, while the small circular figures above the said marks indicate the relative position of the air as it passes from the ingress to the egress point of the cylinder.

5 designates a pipe leading from the pump $5^a$ to the front end of the cylinder and adapted to discharge therein the water impregnated with oil pumped by said pump from the reservoir $5^b$, receiving the discharge of the condenser, (not shown,) which condenser may be a steam-condensing engine or may be one or more radiators of a steam-heating plant, and said pipe is controlled by the valve 7 and by a check-valve 6, located between the pump and valve 7 and adapted to open under the pressure from the pump and automatically close under the back pressure of the cylinder in case the pump should be shut down.

8 designates a drain-pipe communicating with the drain-chamber 2 and controlled by the valve 9, and through this pipe the sediment precipitated from the water and oil is discharged.

10 designates a pipe connecting the purified-water chamber 4 with the boiler (not shown) or with any other suitable receptacle, and said pipe is controlled by valve 11.

12 designates a pipe connecting cylinder 1, by preference at the upper side of the chamber 4, with the live-steam pipe, (not shown,)

and said pipe 12 is controlled by the check-valve 13, which opens under pressure from the steam-pipe, but not from the cylinder, and by a valve 14 interposed between the check-valve and the cylinder.

15 designates a pipe controlled by valve 16 and connecting the passage 3 of the filtration-cylinder with the lower end of the lubricator-cylinder 17, which cylinder is formed by preference with an extension or hollow cap 18, having a stuffing-box 19, vertically above its center. The lubricator-cylinder is provided at its lower end with a drain-cock 20, whereby water may be withdrawn to make room for oil. The lubricator-cylinder is provided also with a plurality of valve-controlled water-tube connections 21, 22, and 23, the former communicating with the lower end of the lubricator-cylinder, the water-tube connection 22 with the middle of the lubricator-cylinder, and the water-tube connection 23 with the upper end of the lubricator-cylinder, said water-tube connections being connected by the transparent gage-tube 24, from which the engineer can tell whether his oil-supply needs renewing or not. The water-tube connection 21 carries a drain-cock 25, which is opened when it is desired to clean out the gage-tube, and said water-tube connections are provided with valves, as described, in order to cut off the escape of the contents of the lubricator-cylinder in case the tube 24 should be broken.

26 designates a valve-controlled coupling communicating with the upper end of the lubricator-cylinder and provided with a flaring mouth or funnel 27 to facilitate the introduction of a new supply of oil into the lubricator-cylinder when necessary. About midway the height of said cylinder it is provided with an oil-exit pipe 28, controlled by the valve 29, and 30 designates an air-vent pipe, which extends down through the stuffing-box 19 and into the extension or cap of the lubricator-cylinder, said vent-pipe supporting at its lower end an angle-bracket 31, to the pendent arm of which is pivoted a plate 32, carrying a valve 33 in the form of a disk of rubber or other suitable material, said disk being clamped upon the plate by means of the ring 34, secured by screws or other devices to the plate 32 and adapted to effectually close the mouth of the vent-pipe, the play or movement of the valve being limited or regulated by the adjusting-screw 35, mounted on bracket 31. The valve-plate is pivotally connected to the upper end of the stem 36 of the oil-float 37, the arrangement being such that as an excess of air accumulates in the upper end of the lubricator-cylinder and thereby lowers the level of the oil therein the float descending with the oil automatically unseats the valve and permits air to escape from the cylinder, this escape of air continuing in practice a sufficient length of time to enable the oil to rise the proper distance to reseat the valve, and thus cut off the escape of the air. It is obvious that provision must be made for the escape of an excess of air; otherwise it would eventually collect in the cylinder 17 in such volume as to prevent the oil rising to the mouth of the exit-pipe 28, and as a result stop the circulation of the oil, leaving the working parts unlubricated. Of course the excess of air could be released by opening the valve 26 slightly, but this would necessitate a close watch upon the part of the engineer, whose time could be more advantageously employed. Without the automatic air-release valve the lubricator would be impracticable. Under pressure of the pump it is obvious that the opening of the valve is instantly accompanied by an upward movement of the oil, and in order to prevent any of the latter from escaping with the air it is essential that there should be considerable air-space between the level of the oil and the mouth of said vent-pipe.

The level of the oil and of the water can always be determined by reference to the gage-tube 24, owing to the fact that the latter communicates with the cylinder at its middle, as well as at its ends, the water rising in the gage-tube by way of water-tube connection 21, the oil entering the gage-tube by way of water-tube connection 22, and the air communicating with the gage-tube by way of water-tube connection 23.

In practice the air which invariably gathers in a condenser—such, for instance, as a radiator—is of course pumped by the pump with the water and oil into the cylinder 1, and its course can be traced through said cylinder by the gurgling of the water, and owing to the difference in specific gravity of the water, oil, and air the former is compelled to occupy the lower part of cylinder 17, the air the upper part, and the oil a position intermediate of the water and air. The cylinder 1 obviously is full of water as long as the apparatus is in operation, through which water the oil and air are forced up into the said cylinder 17 until the cylinder contains water, oil, and air in approximately the volume indicated by the gage-glass, the point $a$ indicating the volume of the water, the space between $a$ and $b$ the volume of the oil, and the space above $b$ the volume of the air, which remain practically uniform, because the slightest lowering of the oil-level, due to excess of air-pressure or any other cause, opens the valve and permits air to escape, as hereinbefore explained.

The operation of the pump, hereinbefore referred to, causes a constant circulation of the oil in the direction indicated by the arrows, Fig. 1, the oil passing from the oil-exit pipe 28 to the service-pipe 38, from which it is conveyed by one or more branch pipes 39 to the pump or engine-cylinder or other parts (not shown) to be lubricated, the oil first, however, passing from the branch pipe 39 through the valve-controlled coupling 40, transparent tube 41, connected therewith, and valve-controlled coupling 42 at the other end of said tube to a branch 43 of the live-steam pipe, the parts 40, 41, and 42 constituting what is known as a "sight-feed." From the pipe 43 the oil passes, together with the live steam, to the cylinder of the pump or engine, (not shown,) through which pump or engine the exhaust-steam and oil passes to the condenser, and thence back through the reservoir to the pump, which pumps this oil and water through pipe 5 into the cylinder constituting the means for filtering and separating the oil from the water, the pressure of said pump serving also to discharge the water from said filtration and separation cylinder through the pipe 10 into the boiler (not shown) or any other receptacle desired. Thus it will be seen that the pressure of the pump may be utilized to maintain two separate circulations, one of oil and air, which follows the course described, and the other of water, discharging the latter into the boiler, as stated, where it is reconverted into steam and discharged into the steam-pipe or its branch 43, where it is mixed with oil, as described, and fed into the cylinder of the pump or engine to lubricate the same, in this double circulation it being observed that the paths of the oil and air and of the water diverge at the discharge end of the filtration and separation cylinder and converge in the live-steam pipe or its branch 43, and it will also be understood by reason of natural forces that though the cylinder is at all times practically full of water the air and oil are enabled to pass up through passage 3, as hereinbefore stated, while the undercurrent of water passes off through the chamber 4 and pipe 10, connected therewith. The sediment precipitated from the oil and water being heavier drops to the bottom of the cylinder 1 and works its way gradually along the same until it is deposited into the drain-chamber 2, through which it is removed, when necessary, by the proper manipulation of the valve 9, as will be readily understood.

As the pressure of the pump connected to pipe 5 equals the boiler-pressure plus the friction between the cylinder 1 and the boiler, it is obvious that as long as the pump is in operation pressure from the boiler through pipe 12 is shut off; but the instant the pump shuts down temporarily for any reason its pressure is replaced by that of the boiler via pipe 12, and the circulation of the oil continues—that is to say, the supply of oil from the lubricator to the operative parts continues until its level gets below the mouth of the pipe 28. This, however, never occurs in practice, because the supply of oil will outlast a temporary shut down of the pump, and where the shut down is to be for a long period of time the operation of the plant obviously must cease. The oil under a temporary shut down of the pump continues to circulate or rather flow and lubricate the operative parts even though it is prevented from entering the cylinder 1 by the closing of the pump outlet-pipe, because of the provision of a reservoir wherein it accumulates, the said reservoir being of sufficient capacity to accommodate all of the water and oil and air which can be forced into it by the boiler-pressure during the short period of inaction of the pump.

When the pump resumes operation, it should be at greater than normal speed until it has worked off the surplus oil and water in the tank.

It is apparent of course that the separation and filtration device may be used independent of the lubricator for the purpose of filtering the oil and separating it from the water and that each purified product may be utilized for other purposes, if desired, than for relubricating the operative parts of machinery or resupplying the boiler.

From the above description it will be apparent that we have produced a combined automatic separator and filter and perpetual lubricator which embodies the features of advantage enumerated as desirable in the statement of invention, and it is to be understood that while the drawings illustrate and the specification describes the preferred embodiment of our invention we do not confine ourselves to this construction, but reserve the right to make such changes as properly fall within its spirit and scope.

Having thus described the invention, what we claim as new, and desire to secure by Letters Patent, is—

1. In an apparatus of the character described, a separating and filtration cylinder, provided with a discharge-passage, a lubricator-cylinder connected to said passage and provided with a communicating gage-tube, and provided also with an air-vent pipe, and a valve for said pipe which is caused to open under the pressure of an excessive volume of air in said lubricator-cylinder, substantially as described.

2. In an apparatus of the character described, a separating and filtration cylinder, provided with a drainage-chamber, a water-chamber, and a passage for the exit mainly of oil and air, in combination with a lubricator-cylinder connected to said passage, and provided with a communicating gage-tube, an air-vent pipe for said lubricator-cylinder, a valve for said pipe, and a float in the liquid below the volume of air and connected to said valve; said float by descending with the liquid-level under the pressure of an excessive volume of air in the lubricator-cylinder, opening said valve and permitting the excess of air to escape through the vent-pipe, substantially as described.

3. In an apparatus of the character described, a separating and filtration cylinder, provided with a drainage-chamber, a water-chamber, and a passage designed for the exit mainly of oil and air, a pipe for supplying oil and air laden water to the cylinder, and provided with a check-valve opening toward the cylinder, valves controlling the exit from the drainage-chamber and water-chamber and said passage, and a live-steam pipe connected to the cylinder and provided with a check-valve adapted to be closed under the pressure which opens the first-named check-valve, substantially as described.

4. In an apparatus of the character described, a separating and filtration cylinder, a lubricator-cylinder communicating with the first-named cylinder and provided with a plurality of water-tube connections, a transparent gage-tube connecting said connections and communicating through the same with the lubricator-cylinder, an air-vent pipe leading from the lubricator-cylinder, and means for causing an excess of air to pass off through said pipe, for the purpose set forth.

5. In an apparatus of the character described, a separating and filtration cylinder, a lubricator-cylinder communicating therewith and provided with a plurality of water-tube connections, a transparent gage-tube connecting said connections and communicating through the same with the lubricator-cylinder, an air-vent pipe communicating with the cylinder, a valve controlling said air-vent pipe, and an oil-float connected to said valve and adapted to open the same under the lowering of the oil-level, substantially as described.

6. In an apparatus of the character described, a separating and filtration cylinder, a lubricator-cylinder communicating therewith, and provided with a plurality of water-tube connections, a transparent gage-tube connecting said connections and communicating through the same with the lubricator-cylinder, and a valve-controlled pipe communicating with the cylinder above the oil-level, substantially as described.

7. In an apparatus of the character described, a separating and filtration cylinder, a lubricator-cylinder communicating therewith and provided with a plurality of water-tube connections, a transparent gage-tube connecting said connections and communicating through the same with the lubricator-cylinder, means for discharging an excess of air from the cylinder, valves controlling the gage-tube connections, a blow-off cock connected to the lowest of said connections, and a drain-cock connected to the lower end of the lubricator-cylinder, substantially as and for the purpose set forth.

In testimony whereof we affix our signatures in the presence of two witnesses.

EUGENE E. KITHCART.
BENJAMIN W. WARNER.

Witnesses:
M. R. REMLEY,
H. C. RODGERS.